Patented Mar. 22, 1938

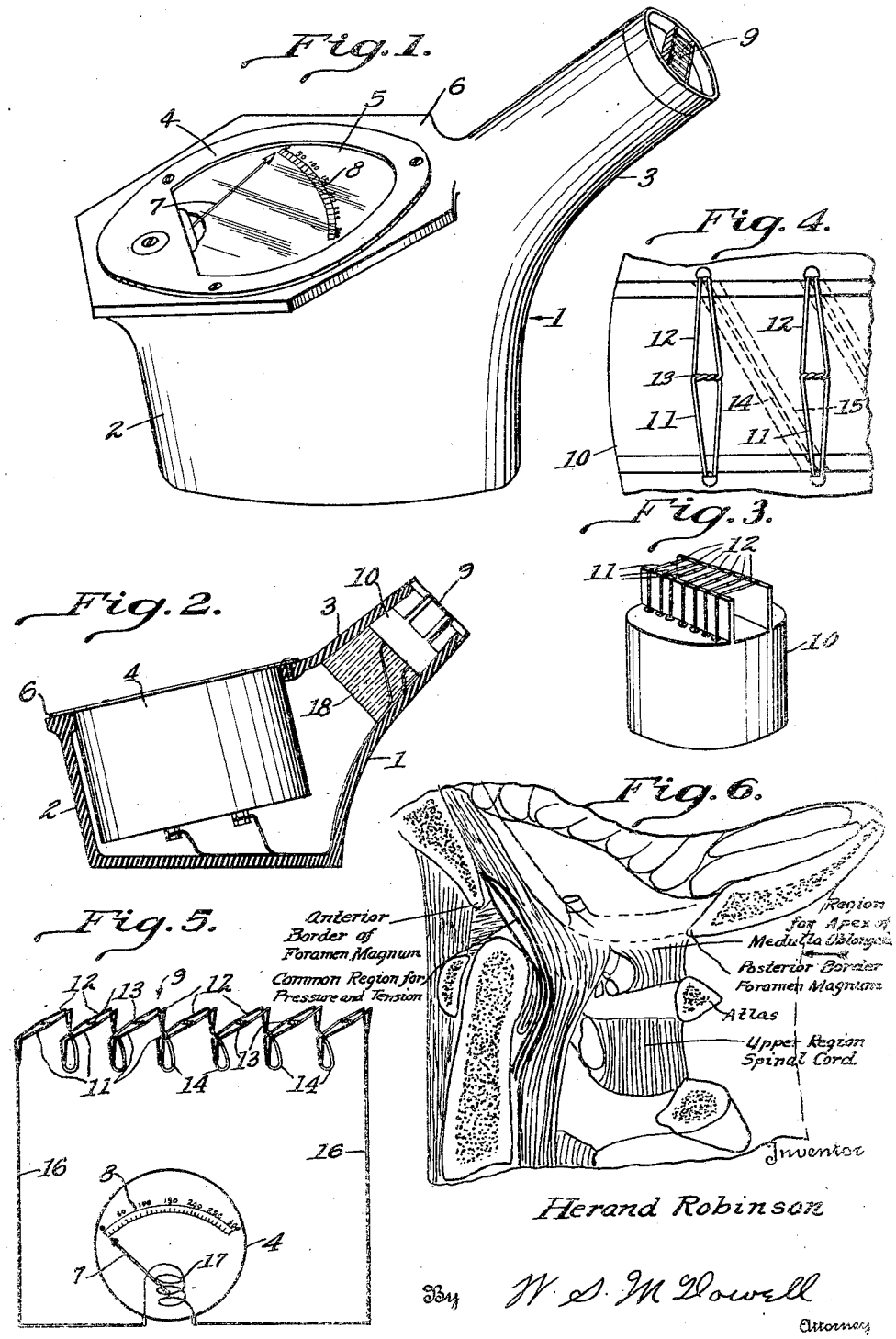

2,111,677

UNITED STATES PATENT OFFICE

2,111,677

APPARATUS FOR LOCATING TENSION OR PRESSURE ON THE MEDULLA OBLONGATA AND ADJACENT TISSUES

Herand Robinson, Columbus, Ohio

Application September 26, 1934, Serial No. 745,598

2 Claims. (Cl. 128—2)

This invention relates to a process and apparatus for locating abnormal tension and/or pressure on the medulla oblongata and adjacent tissues, and consists in determining, through a heat sensitive meter, normal and abnormal temperatures at the base of the skull at the level of the foramen magnum to assist in the detection of various disorders in this region of the human body to permit of corrective measures.

It is an object of the present invention to provide an improved method and apparatus for detecting and determining the heat created by the resistance produced by nerve pressure or tension caused by the reduction of the normal opening of the foramen magnum.

Other objects of the invention are to measure the specific degree of tension and/or pressure produced on the medulla oblongata and the physical members about it; to measure the specific degree of interference to the normal transmission of nerve force between the brain and the body; the employment of a process for supplementing X-ray determinations by reducing the number of X-ray exposures necessary during corrective adjustment of a given disorder as well as before and after such adjustments; to disclose when abnormal pressures have been released at the level of the base of the skull and from the connecting media existing between the brain and the spinal cord; to reveal when abnormal pressure or interference exists in the region specified and when absent; the provision of a detection instrument comprising a thermo-couple and a microammeter, wherein the thermo-couple or thermopile includes a terminal capable of making firm contact on the convexity of the atlanto-occipital articulation; the provision of an instrument of the character indicated wherein slight variations in bodily temperature as low as one-ten-thousandth of a degree centigrade may be detected; and in the provision of other objects which will be in part obvious and in part pointed out hereinafter.

The preferred type of instrument used in connection with the present invention has been illustrated in the accompanying drawing, wherein:

Fig. 1 is a perspective view of the temperature indicating instrument;

Fig. 2 is a vertical sectional view through the case of the instrument, the microammeter and the thermopile being disclosed in side elevation;

Fig. 3 is a perspective view of the thermopile;

Fig. 4 is a detail plan view of the thermopile;

Fig. 5 is a diagrammatic view disclosing the thermopile and its associated microammeter;

Fig. 6 is a view of the median sagittal section through the occipital region.

The present invention is based largely on the belief that between the brain and the body there exists a continuity of nerve fibers connecting one to the other, and that the brain constitutes one pole and the body the other pole, the complete body therefore being a bipolar unit. From one pole to the other in a living process flows a current of electrical energy or life force absent in a dead process and partly in a diseased one, and when there is a bodily disorder, the same is attributable to some abnormality, restriction or interference in this flow of electrical energy or life force between the brain and the body. Many theories have been expounded as to the location of this bodily disorder establishing interference. Various processes of spinal analysis have been propounded, on the basis that interference should be at various intervertebral foramina. However, it is my belief that spinal vertebrae are anatomically so constructed with such articular processes that subluxations in the spinal column become practically impossible or at least are very rare. The head, however, is the most freely movable segment in the body framework. The occipital bone of the skull located at its base and externally convex in shape has the weakest form of articulation with the neck through the atlas bone. Naturally, misalignment at the base of the skull and the opening in the occipital bone which transmits the medulla oblongata with its membranes, the vertebral arteries, and the recurrent portions of the spinal accessory nerves, is the most common and easily produced type of misalignment, readily detectable by the use of X-ray, requiring an anterior and a lateral view of the area involved.

Any misalignment at the base of the skull hindering transmission of electrical conductivity or transmission of mental impulse supply from the brain to the body, or any tension, wrenching, twisting pressure or the like at this level, at the apex of the medulla oblongata, or the intercranial bulb, tends to or will arrest the normal quantity of electrical conductivity supplied by the brain for the body or its parts, these parts becoming diseased due to the lack of energy supply, or totally paralyzed when the entire supply is cut off, releasing the pressure and tension by the correction of the misalignment and restoring health. When the make-up and function of the medulla oblongata, which is also known as the myelencephalon, and its importance in the nerve system is considered, one cannot help but see the far reaching effects hindrance of transmission of nerve force at this level will cause, and likewise appreciate the value of restoring normal flow of energy since authorities, medical and antimedical, are agreed that adequate, unrestricted nerve supply is essential to life and health. In its absence, no action of the body or perception of the senses can materialize.

As the skull, being freely movable, has a weak articulation with the atlas, and the latter in turn is merely a ring, which does not have a rigid axis, increasing possibilities of misalignment between the skull and the atlas are always present. Moreover, there is no locking articulation between the occipital bone and the atlas, as is found in the entire spinal column, to prevent the base of the skull from moving out of position by slipping to either side nor is there any positive provision for preventing the atlas from slipping out of place. Therefore, misalignments and complexities verified by the X-ray become common at this level, reducing the opening at the foramen magnum, and producing pressure upon the apex of the pyramidal medulla and structures transmitted by the foramen magnum. Thus, such a reduced opening at the base of the skull produces pressure upon contents about the outlet of the brain, and this pressure introduces resistance to transmission of nerve or life force (e. g., electrical conductivity) between brain and body. This resistance reduces the normal quantity of energy supplied to the members of the human body so affected and increases the normal heat.

To assist the examiner in determining the presence of such disorders at the base of the skull accurately and expeditiously, there has been illustrated in the accompanying drawing an appliance suitable for this purpose. This analytic appliance in its preferred form comprises a hollow casing 1 preferably of mold composition form, the said casing possessing a kettle-like configuration in that it embodies a substantially hollow cylindrical body 2 and one or more straight, inclined or upwardly and angularly directed spout-like extensions 3. Mounted in the body 2 is a specially constructed sensitive microammeter 4 of very low resistance, the dial face 5 of which being arranged in the plane of the top 6 of the casing so that it may be readily viewed by the examiner in order that the positions of the indicating hand or needle 7 thereof with relation to the graduated surface 8 may be ascertained, indicates degrees centigrade of temperature or current flow which may be readily noted.

In the outer end of the angular extension 3 of the casing, there is arranged a thermo-couple or thermopile 9. It is well understood that when a junction of two dissimilar metals, such as copper or iron and constantan, or copper sulphide and German silver, platinum and silver, to name but a few, is connected to a microammeter, variations in temperature at the point of connection of the two metals will cause deflections of the microammeter needle. This is due to the fact that the electric flow from the junction of the two dissimilar metals varies in response to changes in temperature of the juncture point. Thus when two different metals are placed in contact, and an electric current is sent through the resulting joint, heat is produced at the junction between the metals. The reverse of this also takes place. That is, if the point between the two metals is heated, a voltage will be set up and current will flow in a circuit of which the metals form a part. This is the principle of the thermo-couple, and the electricity produced by the direct action of heat is frequently referred to as thermo-electricity. The amount of voltage depends upon heat applied and the metals used, different metals giving different voltages. Practical combinations are made from antimony and bismuth, German silver and copper sulphide, copper and constantan and from iron and constantan.. Usually the voltage from any one junction is so small that it requires measurements in fractions of microvolts. One such junction is called a thermo-couple, and a collection of thermo-couples in operative relationship is termed a thermopile, In the thermopile, alternate junctions are heated and cooled, this giving rise to a continuous difference of potential through the circuit. The energy required to maintain the heating and cooling is changed into electrical energy.

In the form of the invention herein illustrated, the thermopile 9 comprises a block 10 formed from a suitable insulating material which is received and positioned in the open end of the extension 3. In forming the thermopile, I provide a plurality of loops of dissimilar metals indicated at 11 and 12, each of the said loops being joined by coiling and welding the same as indicated at 13 so that the latter are located substantially centrally of the top or outer surface of the block 10 and as disclosed particularly in Figs. 3 and 4. The portions 11 and 12 are then bent downwardly to lie contiguous to the side surfaces of the block 10 and have their lower ends soldered to angularly connecting wires 14 which may be formed from copper, and by which latter wires the loops 11 and 12 are united in series. The wires 14 are preferably passed through diagonally extending openings 15 formed in the block 10 in order to provide a series coil composed of dissimilar metals. The ends of these series coils are united by the wires 16 with the coils 17 of the microammeter 4, whereby the development of electromotive force in the coil of the thermopile will magnetically actuate the needle 7 of the microammeter causing it to traverse the graduations 8 on the dial 5. When more than one terminal is used, the same should be arranged so as to make firm contact on the convexity at the base of the skull.

In practicing my invention, I determine the temperatures at the base of the skull or in the region of the medulla oblongata by applying the thermopile junction 9 of the analytic instrument to various points at the level of the foramen magnum. Comparative readings to disclose temperature differences may thus be made by the examiner by noting the oscillations of the microammeter needle. It is of course within the scope of the invention to make a graphic record of these temperature dimensions by the employment of an ink stylus on a microammeter needle traveling over a movable chart.

Likewise through electronic tube amplification of the minute currents created, audible signals may be produced of varying degrees of intensity for the purpose of taking the analytical readings. Normally, however, mere visual determination of the temperature conditions will be sufficient.

When the analytical instrument is used during periods of warm weather, or in a warm room atmosphere, an increased temperature differential may be maintained between the terminals of the thermopile by encasing the lower or inner portion of the thermopile within a suitable cement or other moldable composition as indicated at 18 in the drawing.

What is claimed is:

1. An analytic instrument for determining differences in temperature at various points at the level of the foramen magnum in the region of the base of the skull, comprising a casing of substantially kettle shape having an upwardly inclined spout-like projection at one side adapted for application at its mouth to various points at the level of the foramen magnum, a series thermopile coil of dissimilar metals mounted in the spout-like projection of the casing and with the thermopile junctions of the dissimilar metals exposed at the mouth of the casing projection, and a microammeter mounted in the casing and connected in series with said thermopile coil and having a dial face opening through the top of the casing inwardly of the spout-like projection, whereby variations indicated on the dial incident to changes in temperature of the thermopile coil when applied to the various points at the base of the skull may be readily observed while the instrument is held in testing position.

2. An analytic instrument for determining differences in temperature at various points at the level of the foramen magnum in the region of the base of the skull, comprising a casing having an upper surface portion with an opening therethrough, said casing having a tubular projection at one side extending outwardly from the side portions of the casing, a series thermopile coil having the juncture of the dissimilar metals mounted in and exposed at the outer end of said tubular projection for contact with the head at the base of the skull, and a microammeter mounted in the casing having a dial face exposed through said upper surface opening of the casing and connected in series with said thermopile coil for showing at the top of the casing during the application of the instrument variations in temperature transmitted by the thermopile coil incident to contact of the exposed junctions of the coil against various points at the base of the skull.

HERAND ROBINSON.